April 6, 1937. E. C. PHILLIPS 2,075,865
MOTOR STARTER
Filed March 2, 1936
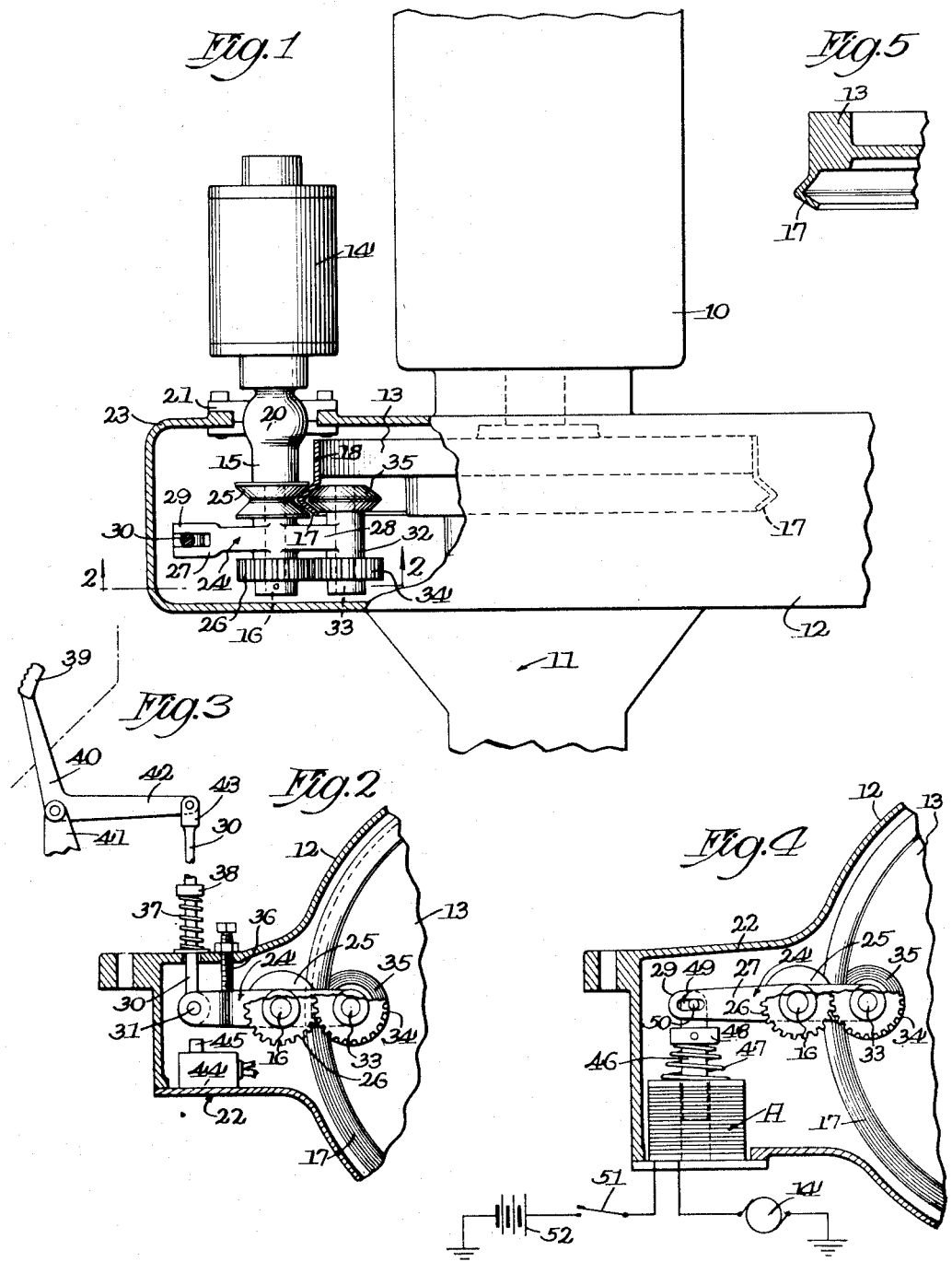
Inventor:
Elwood C. Phillips
By George I. Haight Atty.

Patented Apr. 6, 1937

2,075,865

UNITED STATES PATENT OFFICE 2,075,865

MOTOR STARTER

Elwood C. Phillips, Evanston, Ill.

Application March 2, 1936, Serial No. 66,660

8 Claims. (Cl. 74—8)

This invention relates to improvements in starting mechanisms for engines, and more particularly for engines of automobiles.

One object of the invention is to provide a simple and efficient starting mechanism for automobile engines, wherein the starting motor is brought into operative driving relation with the engine by establishing direct connection between the rotary driving element of the motor and the flywheel of the engine.

A more specific object of the invention is to provide a mechanism of the character described in the preceding paragraph, wherein operative connection between the starting motor and the engine is effected by a simple and reliable friction drive means.

A further object of the invention is to provide a starting mechanism for engines including a friction drive mechanism between the starting motor and the flywheel of the engine, wherein the driving connection between the rotary driving element of the starting motor and the engine flywheel is effected by friction driving members, which are arranged so as to tightly grip the cooperating driving portion of the flywheel when the starting mechanism is thrown into operation.

Other objects of the invention will more clearly appear from the description and claims hereinafter following.

In the drawing forming a part of this specification, Fig. 1 is a top plan view of a portion of the engine and associated gear case of an automobile, illustrating my improved starting mechanism in connection therewith, the engine flywheel being illustrated as enclosed in a casing and the wall of said casing being partly broken away to show the parts contained therein.

Fig. 2 is a vertical sectional view corresponding substantially to the line 2—2 of Fig. 1.

Fig. 3 is a side elevational view of a control pedal and certain connections for the starting mechanism shown in Figs. 1 and 2.

Fig. 4 is a view similar to Fig. 2, illustrating another embodiment of the invention and further illustrating certain electrical connections diagrammatically.

Fig. 5 is a fragmentary, transverse, sectional view of a portion of the engine flywheel, illustrating a modified form of flywheel.

In said drawing, 10 indicates the rear portion of an automobile engine, 11 the associated gear case, and 12 a casing or housing enclosing the usual engine flywheel, which is indicated by 13.

In carrying out my invention, as shown in Figs. 1, 2, and 3, I employ an electric starting motor 14 of the usual type, the parts of which are enclosed in a housing having a sleevelike extension 15, through which the drive shaft 16 of the motor extends. The flywheel 13 has a laterally projecting, annular flange 17 of V-shaped cross section. As disclosed in Fig. 1, the flange 17 is formed on a ringlike band 18, which fits the flywheel and is fixed thereto in any well known manner. As shown in Fig. 5, the flange 17 may be cast integral with the flywheel and formed as a part of the rim of said wheel.

The starting motor 14 is preferably swingingly supported on the casing 12 by a ball and socket connection comprising an enlarged, partly spherical or ball-like portion 20 on the sleeve extension 15 of the housing of the motor, swiveled in a bearing seat formed in a sectional bearing 21 fixed to the casing 12. The sleeve 15 of the starting motor housing extends through the bearing member 21 into the casing 12, as shown in Fig. 1, and is normally disposed in substantially parallel relation to the axis of rotation of the flywheel 13. As shown in Figs. 1 and 2, the casing 12 is provided with a laterally extended portion forming a chamber 22 adjacent to the flywheel 13, which chamber houses certain parts of the mechanism, as hereinafter pointed out. The bearing member 21 is mounted on the front wall 23 of this chamber. The chamber 22 opens into the main portion of the casing 12 and forms a continuation thereof.

The shaft 16 of the starting motor 14 extends outwardly beyond the end of the sleeve 15 and has a rocking, leverlike member 24 journaled thereon. A friction drive pulley 25 having a V-shaped peripheral groove is fixedly mounted on the shaft 16 between the lever member 24 and the end of the sleeve 15. The grooved friction drive pulley 25 rotates with the shaft 16 while the lever member 24 is freely swingable on said shaft. The shaft 16 extends outwardly beyond the lever member 24 and a spur gear 26 is fixed to said outer end portion of the shaft. The leverlike member 24 has arms 27 and 28 extending in opposite directions from the journal portion thereof. The outer end of the arm 27 is forked, as indicated at 29, to accommodate the end of an actuating rod 30, which is pivoted to said end of the arm by a pin 31 extending through the arms of the forked portion 29 and the end of said rod. The arm 28 has a fixed bearing sleeve 32 at the outer end thereof, which is preferably formed integral with said arm. The bore of the bearing sleeve 28 extends parallel to the shaft 16 and a short shaft 33 is rotatably mounted therein. The opposite ends of the shaft 33 project outwardly of the bearing sleeve, and a spur gear 34 is fixed to one end thereof and meshes with the spur gear 26. A friction drive pulley 35 is fixed to the other end of the shaft 33 and is located in substantially transverse alignment with the friction drive pulley 25. The projecting rim portion of the pulley 35 is of substantially V-shaped cross section, as shown, and is complementary to the V-shaped groove of the pulley 25. As shown most clearly in Fig. 1, the pulleys 25 and 35 are disposed respectively on the outer and inner sides of the rim 17 of the flywheel 13 and are normally slightly spaced from said rim to provide clearance therebetween to permit free rotation of the flywheel with respect to said pulleys. The lever 24 is held in said normal position by a set screw 36, which acts as a stop, as shown in Fig. 2, the set screw 36 being threaded through the top wall of the chamber 22 of the casing 12. As will be evident when the starting motor 14 is in operation, the pulleys 25 and 35 will be rotated in unison in opposite directions through the connecting spur gears 26 and 34. The rod 30 serves to actuate the lever 24, when desired, to swing the same on the shaft 16 and bring the friction drive pulleys 25 and 35 into clamping engagement with the rim 17 of the flywheel 13 and effect rotation of the latter. The rod 30 extends freely through an opening in the top wall of the chamber 22 and is yieldingly held in raised position by a compression spring 37 interposed between the top of the casing and a fixed collar 38 on said rod.

A foot pedal is preferably employed to actuate the rod 30. Such a pedal is illustrated in Fig. 3, in which the pedal is indicated by 39. The pedal 39 is carried on the upper arm of a bell crank lever 40 pivoted on a support 41 mounted on a fixed portion of the frame of the automobile. The arm of the bell crank lever 40, on which the pedal is carried, extends through the usual footboard of the automobile, said footboard being indicated in dotted lines in Fig. 3. The lower arm 42 of the bell crank lever 40 is operatively connected to the rod 30, the upper end of the rod 30 being provided with a forked portion 43 receiving the extremity of the arm 42 and being connected to the latter by a pivot pin.

The usual electric switch is employed for controlling the operation of the starting motor 14 in a well known manner. This switch is contained in a box 44 in the chamber 22 mounted on the bottom wall of said chamber. The box 44 is located below the lever 24. The switch is provided with an actuating button 45, which is located immediately below the outer end portion of the arm 27 of the lever 24, to be engaged and actuated by said arm when the same is depressed.

The operation of my improved mechanism, as shown in Figs. 1, 2, and 3, in starting the automobile engine is as follows: The automobile driver depresses the pedal 39, thereby also depressing the rod 30 and swinging the arm 27 of the lever 24 downwardly. By this action the lever arm 28 is swung upwardly about the axis of the shaft 16 of the starting motor 14, thus bringing the friction drive pulleys 25 and 35 into tight clamping engagement with the V-shaped flange 17 of the rim of the flywheel 13. At the same time, the outer end of the arm 27 of the lever 24 will engage and depress the switch button 45, closing the starting motor circuit and causing the motor to operate and drive the flywheel 13 through the friction drive pulleys 25 and 35.

When the foot pedal 39 is permitted to rise, the spring 37 will return the parts to the normal position shown in Fig. 2, thereby releasing the frictional engagement between the pulleys 25—35 and the flywheel 13, and also opening the starting switch to stop the motor 14 by releasing the switch button 45.

Referring next to the embodiment of the invention illustrated in Fig. 4, it is pointed out that the structure shown therein is similar to that shown in Figs. 1 and 2, with the exception that a different form of means is employed for controlling the operation of the starting motor and effecting swinging movement of the lever which carries the friction drive pulleys.

As shown in Fig. 4, a solenoid coil A is mounted within the chamber 22 on the bottom wall 12 thereof and a reciprocating, vertically disposed plunger 46 is actuated by said solenoid. The plunger 46 is yieldingly supported by a compression spring 47 interposed between the top of the solenoid and a fixed collar 48 on said plunger. As is well known, when the solenoid is energized, the plunger 46 will be pulled downwardly against the tension of the spring 47. The spring 47 returns the plunger to raised position when the solenoid circuit is opened. The upper end of the plunger 46 is pivotally connected to the forked outer end 29 of the arm 27 of the lever 24 to actuate the latter. As shown, the forked portion 29 of the lever arm 27 is horizontally slotted, as indicated at 49, and a pin 50 fixed to the upper end of the plunger 46 engages within the slots of the lever arm. This slotted connection is provided to prevent binding of the parts.

The electric circuit, in which the solenoid A is contained, includes the usual controlling switch, which is diagrammatically indicated at 51. As further shown diagrammatically in Fig. 4, the circuit in which the switch is located leads from the usual storage battery 52 to the solenoid A and from said solenoid to the starting motor 14. As is well understood by those skilled in this art, when the switch 51 is closed, the current will flow through the solenoid A to the starting motor 14. The solenoid A is thus energized to pull the plunger 46 downwardly and the motor 14 is caused to operate. The plunger 46, through its operative connection with the lever 24, effects rocking movement of the lever and brings the friction drive pulleys 25 and 35 into operative clutching relation with the rim of the flywheel 13 to drive the latter in the manner hereinbefore described in connection with Figs. 1, 2, and 3. When the electric current is cut off to stop the starting motor 14, by opening the switch 51 the solenoid A will be deenergized, thereby permitting the spring 47 to expand and raise the plunger 46 and the arm 27 of the lever 24. The grip of the friction drive pulleys 25 and 35 will thus be released from active frictional engagement with the flywheel 13.

I have herein shown and described what I now consider the preferred manner of carrying out my invention, but the same is merely illustrative and I contemplate all changes and modifications that come within the scope of the claims appended hereto.

I claim:

1. In an engine starting mechanism, the combination with an engine having a flywheel provided with a rim; of a lever member pivoted for swinging movement, said lever member having the pivot thereof disposed eccentrically to the axis of rotation of said flywheel; rotary friction drive members mounted on said lever member and arranged on the inner and outer sides of said rim; means for rotating said friction drive members; and means for rocking said lever member on its pivot to bring said drive members into clamping frictional engagement with the inner and outer sides of said rim.

2. In an engine starting mechanism, the combination with an engine having a flywheel provided with a rim; of a rotary drive shaft; a lever freely pivoted on said drive shaft; a rotary friction drive member fixed to said shaft and disposed on the outer side of said rim; a second rotary friction drive member on said lever disposed on the inner side of said rim; means on said drive shaft for driving said second named rotary friction drive member; means for rotating said shaft; and means for rocking said lever to bring said friction drive members into operative frictional driving contact with said rim of the flywheel.

3. In an engine starting mechanism, the combination with an engine having a rotary flywheel provided with a rim; of a starting motor having a rotary drive shaft, the shaft of said motor being disposed outwardly of the rim of the flywheel in parallel relation to the axis of rotation of said flywheel; a friction drive pulley fixed to said shaft and adapted to cooperate with said rim of the flywheel; a lever journaled on said shaft and having an arm extending inwardly of the flywheel; a friction drive pulley rotatably mounted on said lever arm and disposed on the inner side of said flywheel; and means for rocking said lever to bring said friction drive pulleys into operative clamping driving engagement with the rim of said flywheel.

4. In an engine starting mechanism, the combination with an engine having a rotary flywheel provided with a rim; of a starting motor having a rotary drive shaft, the shaft of said motor being disposed outwardly of the rim of the flywheel in parallel relation to the axis of rotation of said flywheel; a friction drive pulley fixed to said shaft and adapted to cooperate with said rim of the flywheel; a lever journaled on said shaft and having an arm extending inwardly of the flywheel; a friction drive pulley rotatably mounted on said lever arm and disposed on the inner side of said flywheel; means for rocking said lever to bring said friction drive pulleys into operative clamping driving engagement with the rim of said flywheel; and means actuated by movement of said lever for starting and stopping operation of said motor.

5. In an engine starting mechanism, the combination with an engine having a flywheel provided with a rim; of means for rotating said flywheel including a starting motor having a drive shaft, and a pair of friction pulleys driven by said shaft and adapted to grip the inner and outer sides of the rim of the flywheel, one of said pulleys being fixed to the drive shaft; lever means on which the other pulley is carried, said lever means being pivotally mounted on said shaft; and means for swinging said lever means to operatively engage said pulleys with the rim of the flywheel.

6. In an engine starting mechanism, the combination with an engine having a flywheel provided with a rim; of a starting motor having a rotary drive shaft, said shaft being disposed adjacent to the rim of said flywheel; a lever pivoted on said shaft, said lever having oppositely extending arms; means engaging one arm of said lever for swinging the lever on its pivot; a friction drive pulley journaled on the outer end of the other arm of the lever and engageable with the inner side of said flywheel rim; a second friction drive pulley fixed to said shaft and engageable with the outer side of the rim of the flywheel; and means operatively connecting said shaft and first named pulley for rotating the latter.

7. In an engine starting mechanism, the combination with an engine having a flywheel provided with a peripheral annular flange of V-shaped cross section; of a pair of rotary friction drive pulleys disposed respectively on the inner and outer sides of said rim, one of said pulleys having a V-shaped groove and the other having a complementary projection adapted to grip opposite sides of said V-shaped flange of the flywheel; means for simultaneously rotating said pulleys in opposite directions; and means for bringing said pulleys into frictional clamping engagement with opposite sides of said flywheel flange.

8. In an engine starting mechanism, the combination with an engine having a flywheel provided with a rim; of a rotary drive shaft adjacent to said flywheel rim; a lever freely swingable on said rotary shaft, said lever having oppositely extending arms; means connected to one of said arms for swinging said lever; a rotary friction drive pulley mounted on the outer end of the other arm of said lever and disposed inwardly of the rim of said flywheel; driving connections between said pulley and said shaft; a second friction drive pulley fixed to said rotary shaft and disposed on the outer side of the rim of the flywheel; and means for actuating said connecting means to swing said lever and bring the friction pulleys into clamping driving engagement with the inner and outer sides of the rim of the flywheel.

ELWOOD C. PHILLIPS.